(12) United States Patent
Kuma

(10) Patent No.: US 10,006,332 B2
(45) Date of Patent: Jun. 26, 2018

(54) ENGINE SYSTEM AND CONTROL APPARATUS AND CONTROL METHOD FOR ENGINE SYSTEM

(71) Applicant: TOYOTA JIDOSHA KABUSHIKI KAISHA, Toyota-shi, Aichi-ken (JP)

(72) Inventor: Hiroshi Kuma, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 15/308,634

(22) PCT Filed: Apr. 30, 2015

(86) PCT No.: PCT/IB2015/000598
§ 371 (c)(1),
(2) Date: Nov. 3, 2016

(87) PCT Pub. No.: WO2015/177614
PCT Pub. Date: Nov. 26, 2015

(65) Prior Publication Data
US 2017/0145891 A1 May 25, 2017

(30) Foreign Application Priority Data
May 19, 2014 (JP) .................. 2014-103667

(51) Int. Cl.
*F01N 3/36* (2006.01)
*F01N 3/025* (2006.01)
*F02B 37/24* (2006.01)

(52) U.S. Cl.
CPC .............. *F01N 3/36* (2013.01); *F01N 3/0253* (2013.01); *F02B 37/24* (2013.01); *F01N 2610/03* (2013.01)

(58) Field of Classification Search
CPC ........ F01N 3/0253; F01N 3/2006; F01N 3/36; F01N 2610/03; F02B 37/24; F02B 39/005
See application file for complete search history.

(56) References Cited

FOREIGN PATENT DOCUMENTS

| JP | 2006-152948 A | 6/2006 |
|----|---------------|--------|
| JP | 2006-194135 A | 7/2006 |
| JP | 2013-096355 A | 5/2013 |
| WO | 2013/064875 A1 | 5/2013 |
| WO | 2013/074094 A1 | 5/2013 |

*Primary Examiner* — Jonathan Matthias
(74) *Attorney, Agent, or Firm* — Oliff PLC

(57) ABSTRACT

An engine system includes a turbocharger (16), an exhaust gas control apparatus (81), a fuel addition device (82), a heating unit, and an ECU. The turbocharger includes a variable nozzle mechanism (34). The exhaust gas control apparatus is disposed on an exhaust downstream side of the exhaust turbine in an exhaust passage. The fuel addition device is configured to add a fuel to the exhaust gas of the engine to recover the function of the exhaust gas control apparatus on a further exhaust upstream side than the exhaust turbine. The heating unit is configured to heat the link chamber (52). The ECU is configured to execute heating control for controlling the initiation and the stopping of heating by the heating unit and execute the heating control in a period overlapping with at least part of a period when the addition of the fuel by the fuel addition device is executed.

8 Claims, 8 Drawing Sheets

ENGINE SYSTEM AND CONTROL APPARATUS AND CONTROL METHOD FOR ENGINE SYSTEM

BACKGROUND OF THE INVENTION

1. Field of the Invention

The invention relates to an engine system that has a turbocharger which is provided with a variable nozzle mechanism and a fuel addition device which performs fuel addition to exhaust gas and a control apparatus and a control method for an engine system.

2. Description of Related Art

Japanese Patent Application Publication No. 2006-152948 (JP 2006-152948 A) discloses a turbocharger that is provided with a variable nozzle mechanism. The variable nozzle mechanism is provided with a plurality of nozzle vanes around a turbine wheel in a flow path (exhaust flow path) through which exhaust gas passes in an exhaust turbine. The plurality of nozzle vanes are arranged at predetermined intervals around the axis of rotation of the turbine wheel. The nozzle vanes are connected to each other by a link mechanism in a link chamber adjacent to the exhaust flow path and are subjected to opening and closing operations in a state of being synchronized with each other. In the turbocharger, the nozzle vanes are driven to be opened and closed at the same time through operation control for the variable nozzle mechanism so that the gaps between the adjacent nozzle vanes are changed. In this manner, the flow speed of the exhaust gas that is sprayed to the turbine wheel through the spaces between the nozzle vanes is changed, and the pressure-feeding amount of intake air is adjusted.

JP 2006-152948 A discloses a fuel addition device that regularly executes fuel addition to the exhaust gas for functional recovery of an exhaust gas control apparatus (exhaust gas purifying catalyst, filter, or the like) that is disposed in an exhaust passage of an internal combustion engine. A fuel addition valve that adds a fuel to a further exhaust upstream side than a turbine in the exhaust passage is disposed in a fuel ignition device described above. The fuel is added to the exhaust gas through the fuel injection from the fuel addition valve.

SUMMARY OF THE INVENTION

The turbocharger that is provided with the variable nozzle mechanism has a structure in which the nozzle vane that is arranged in the exhaust flow path and the link mechanism that is disposed outside the exhaust flow path (specifically, in the link chamber) are connected to each other. Accordingly, a gap may be formed in a partition wall between the exhaust flow path and the link chamber. In the turbocharger, part of the exhaust gas that passes through the exhaust flow path may flow into the link chamber via the gap when the pressure in the exhaust flow path is high.

If the fuel addition to the exhaust gas is performed on a further exhaust upstream side than the exhaust turbine in the turbocharger, the exhaust gas that contains the fuel passes through the exhaust turbine. Accordingly, part of the exhaust gas may permeate into the link chamber via the gap along with the fuel. In this case, the fuel that permeates into the link chamber may be altered to become a deposit, which is a factor causing malfunctioning of the link mechanism and the variable nozzle mechanism.

The invention provides an engine system that is capable of suppressing the accumulation of a deposit in a link chamber of a turbocharger and a control apparatus and a control method for an engine system.

According to a first aspect of the invention, there is provided an engine system including a turbocharger, an exhaust gas control apparatus, a fuel addition device, a heating unit, and an electronic control unit. The turbocharger includes a variable nozzle mechanism. The variable nozzle mechanism includes a plurality of nozzle vanes, a link chamber, and a link mechanism. The plurality of nozzle vanes is disposed in an exhaust flow path of an exhaust turbine. The link chamber is adjacent to the exhaust flow path. The link mechanism is disposed in the link chamber and is configured to connect the plurality of nozzle vanes. The exhaust gas control apparatus is disposed on an exhaust downstream side of the exhaust turbine in an exhaust passage of an internal combustion engine, and the exhaust gas control apparatus is configured to purify exhaust gas. The fuel addition device is disposed on an exhaust upstream side of the exhaust turbine, and the fuel addition device is configured to add fuel to the exhaust gas of the internal combustion engine to recover a function of the exhaust gas control apparatus. The heating unit is configured to heat the link chamber. The electronic control unit is configured to execute a heating control. In the heating control, the electronic control unit is configured to initiate and stop heating of the link chamber by the heating unit, and the electronic control unit is configured to execute the heating control in a period overlapping with at least part of a period when an addition of fuel by the fuel addition device is executed.

If a state where a liquid fuel adheres into the link chamber of the turbocharger continues, the adhering fuel may be gradually altered to give rise to a deposit. Even if the fuel permeates into the link chamber, the liquefaction of the permeating fuel is suppressed if the temperature in the link chamber is sufficiently high. Then, the adhesion of the fuel in the link chamber is suppressed, and thus the accumulation of the deposit is suppressed. Still, maintaining a high-temperature state of the turbocharger by heating the turbocharger without stopping the heating may result in overheating deteriorating the reliability of the turbocharger.

According to the control apparatus described above, the link chamber can have a high temperature therein through the heating by the heating unit when the fuel addition by the fuel addition device is executed for functional recovery of the exhaust gas control apparatus. Accordingly, even in a case where the fuel has permeated into the link chamber, the permeating fuel can be vaporized and the link chamber can have a dry state therein. Since the exhaust gas of the internal combustion engine flows at a high speed in the exhaust flow path, the exhaust gas in the link chamber is discharged out of the link chamber through a gap by the flow of the exhaust gas. Accordingly, the fuel vaporized in the link chamber is also discharged out of the link chamber into the exhaust flow path along with the flow of the exhaust gas. Accordingly, a state where the liquid fuel adheres into the link chamber can be suppressed, and the alteration of the permeating fuel to the deposit can be suppressed. The heating of the link chamber can be stopped when the possibility of the permeation of the fuel into the link chamber is low with the fuel addition by the fuel addition device not executed. In this case, the temperature of the turbocharger can be lowered. Compared to heating the turbocharger without stopping the heating, an increase in the temperature of the turbocharger can be suppressed according to the control apparatus described above. In this manner, deterioration in the reliability of the turbocharger attributable to overheating can be suppressed.

In the engine system described above, the electronic control unit may be configured to set a timing of the initiation of the heating of the link chamber to precede a timing of the initiation of the addition of fuel by the fuel addition device.

According to the engine system described above, the temperature in the link chamber can be increased in advance when the fuel addition to the exhaust gas by the fuel addition device is initiated. Accordingly, it is possible to suppress the liquefaction of the fuel permeating into the link chamber, and the adhesion of the deposit to the link mechanism can be suppressed.

In the engine system described above, the electronic control unit may be configured to set a timing of the stopping of the addition of fuel by the fuel addition device to precede a timing of the stopping of the heating of the link chamber.

According to the engine system described above, the temperature in the link chamber can be maintained at a high temperature until the termination of the fuel addition by the fuel addition device. Accordingly, it is possible to appropriately suppress the liquefaction of the fuel permeating, into the link chamber, and the adhesion of the deposit to the link mechanism can be appropriately suppressed.

In the engine system described above, the turbocharger may include a compressor, the exhaust turbine and a center housing. The compressor may be disposed in an intake passage of the internal combustion engine. The center housing may be configured to connect the compressor and the exhaust turbine to each other. The link chamber may be disposed between the exhaust turbine and the center housing. The center housing may include a housing coolant passage through which a coolant circulates. The heating unit may be configured to heat the link chamber by introducing a high-temperature coolant into the housing coolant passage.

According to the engine system described above, the link chamber arranged between the center housing and the exhaust turbine can be heated by introducing high-temperature water into the housing coolant passage and heating the center housing. In a case where the engine system is provided with the turbocharger that is provided in advance with the housing coolant passage, the heating unit can be disposed, without changing the structure of the turbocharger, by using the housing coolant passage.

The engine system may further include a communication passage and a flow path switching valve. The communication passage may be configured to connect an outlet of a turbine coolant passage and an inlet of the housing coolant passage. The exhaust turbine may include the turbine coolant passage through which the coolant circulates. The flow path switching valve may be disposed in the communication passage. The electronic control unit may be configured to execute operation control of the flow path switching valve to allow the flow of the coolant from the outlet of the turbine coolant passage into the inlet of the housing coolant passage via the communication passage during the execution of the heating of the link chamber by the heating unit. The electronic control unit may be configured to prohibit the flow of the coolant from the outlet of the turbine coolant passage into the inlet of the housing coolant passage via the communication passage during the stopping of the heating of the link chamber by the heating unit.

According to the engine system described above, the water that is increased in temperature through the turbine coolant passage in the exhaust turbine can be introduced into the housing coolant passage in the center housing via the communication passage through the operation control for the flow path switching valve. Accordingly, the link chamber can be heated. Through the operation control for the flow path switching valve, the flow of the high-temperature water into the housing coolant passage can be prevented and it is possible to allow only the water that has a relatively low temperature in an introduction path to flow into the housing coolant passage. Accordingly, the heating of the link chamber can be stopped.

The engine system may further include the introduction path and a discharge path. The introduction path may be configured to connect an inlet of the turbine coolant passage and the inlet of the housing coolant passage to each other in parallel. The discharge path may be configured to connect the outlet of the turbine coolant passage and an outlet of the housing coolant passage to each other in parallel. The electronic control unit may be configured to connect the housing coolant passage and the turbine coolant passage to each other in series during execution of the heating of the link chamber by the heating unit. The electronic control unit may be configured to connect the housing coolant passage and the turbine coolant passage to each other in parallel during the stopping of the heating of the link chamber by the heating unit.

According to the engine system described above, only the water that is increased in temperature through the turbine coolant passage flows into the housing coolant passage via the communication passage during the execution of the heating by the heating unit. Accordingly, the link chamber can be efficiently heated by using the high-temperature water. When the heating by the heating unit is stopped, the water that is increased in temperature through the turbine coolant passage does not flow into the housing coolant passage and it is possible to allow only the water that has a relatively low temperature in the introduction path without passing through the turbine coolant passage to flow into the housing coolant passage. Accordingly, the temperature of the center housing can be lowered.

In the engine system described above, the electronic control unit may be configured to prohibit the heating of the link chamber when a temperature of the exhaust gas of the internal combustion engine is at least a predetermined temperature during the execution of the fuel addition by the fuel addition device.

When the temperature of the exhaust gas of the internal combustion engine is high, both the temperature of the turbocharger and the temperature in the link chamber are likely to be increased. The fuel that has permeated into the link chamber is vaporized and the link chamber can have a dry state therein, even if the heating by the heating unit is not performed, if the temperature in the link chamber is sufficiently increased by heat received from the exhaust gas of the internal combustion engine. Accordingly, the alteration of the fuel to the deposit is suppressed.

According to the engine system described above, unnecessary execution of the heating by the heating unit can be suppressed when the accumulation of the deposit in the link chamber is suppressed with the temperature in the link chamber being sufficiently increased. Accordingly, deterioration in the reliability of the turbocharger attributable to overheating can be suppressed.

According to a second aspect of the invention, there is provided a control apparatus for an engine system, the engine system including a turbocharger, an exhaust gas control apparatus, a fuel addition device, and a heating unit. The turbocharger includes a variable nozzle mechanism. The variable nozzle mechanism includes a plurality of nozzle vanes, a link chamber, and a link mechanism. The plurality of nozzle vanes is disposed in an exhaust flow path of an exhaust turbine. The link chamber is adjacent to the exhaust flow path. The link mechanism is disposed in the link chamber and is configured to connect the plurality of nozzle vanes. The exhaust gas control apparatus is disposed on an exhaust downstream side of the exhaust turbine in an exhaust passage of an internal combustion engine, and the exhaust gas control apparatus is configured to purify exhaust gas. The fuel addition device is disposed on an exhaust upstream side of the exhaust turbine, and the fuel addition device is configured to add fuel to the exhaust gas of the internal combustion engine to recover a function of the exhaust gas control apparatus. The heating unit is configured to heat the link chamber. The control apparatus includes an electronic control unit configured to execute a heating control. In the heating control, the electronic unit is configured to initiate and stop heating of the link chamber by the heating unit, and the electronic control unit is configure d to execute the heating control in a period overlapping with at least part of a period when an addition of fuel by the fuel addition device is executed.

According to a third aspect of the invention, there is provided a control method for an engine system. The engine system includes a turbocharger, an exhaust gas control apparatus, a fuel addition device and a heating unit. The turbocharger includes a variable nozzle mechanism. The variable nozzle mechanism includes a plurality of nozzle vanes, a link chamber, and a link mechanism. The plurality of nozzle vanes is disposed in an exhaust flow path of an exhaust turbine. The link chamber is adjacent to the exhaust flow path. The link mechanism is disposed in the link chamber and is configured to connect the plurality of nozzle vanes. The exhaust gas control apparatus is disposed on an exhaust downstream side of the exhaust turbine in an exhaust passage of an internal combustion engine, and the exhaust gas control apparatus is configured to purify exhaust gas. The fuel addition device is disposed on an exhaust upstream side of the exhaust turbine, and the fuel addition device is configured to add fuel to the exhaust gas of the internal combustion engine to recover a function of the exhaust gas control apparatus. The heating unit is configured to heat the link chamber. The control method includes executing heating control for controlling the initiation and the stopping of heating of the link chamber by the heating unit, and executing the heating control in a period overlapping with at least part of a period when an addition of the fuel by fuel addition device is executed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
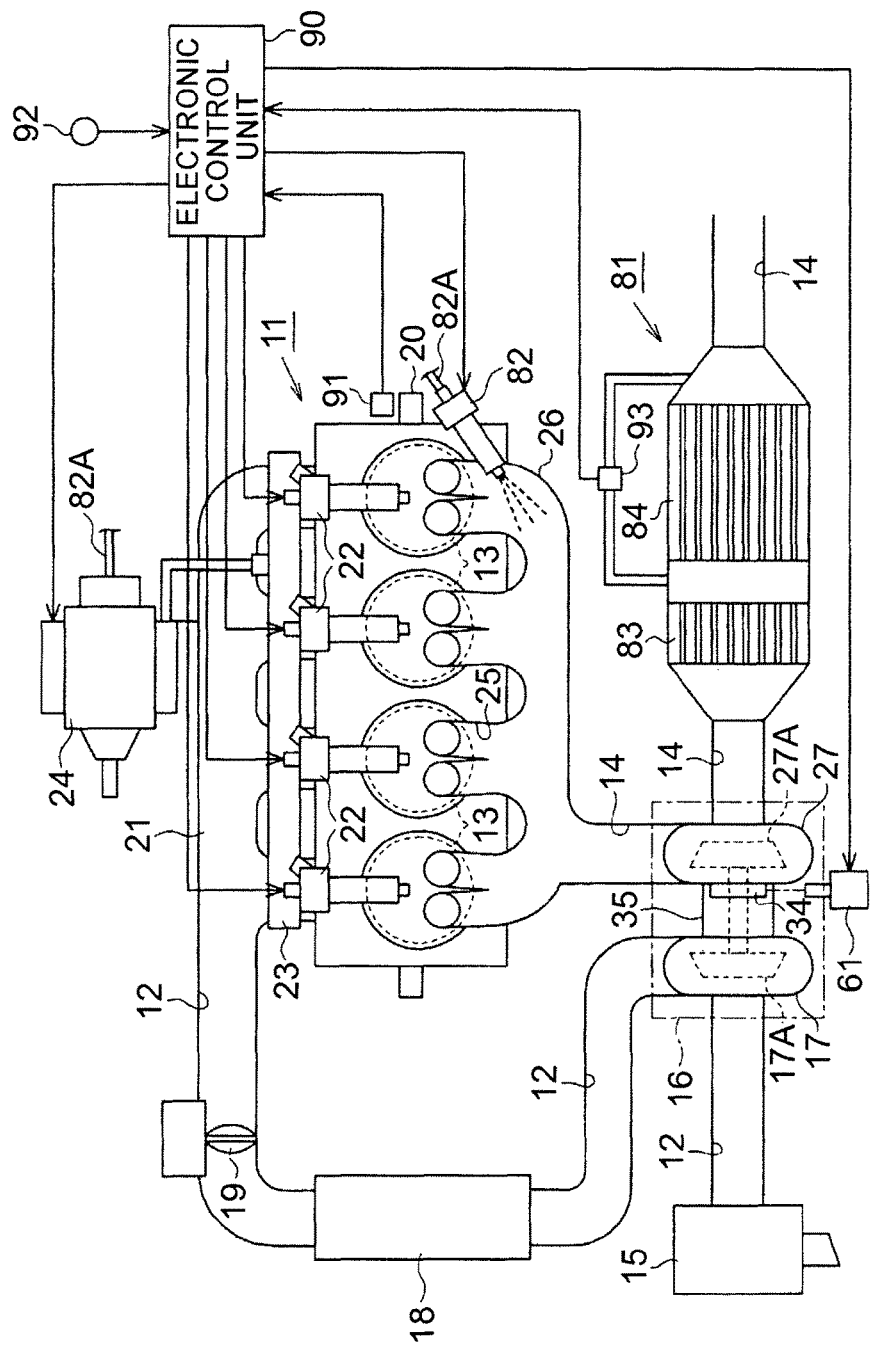
FIG. 1 is a schematic diagram illustrating a schematic configuration of a control apparatus for an engine system according to an embodiment.

Hereinafter, an embodiment of a control apparatus for an engine system will be described. As illustrated in FIG. 1, an internal combustion engine 11 is provided with an intake passage 12, combustion chambers 13, and an exhaust passage 14. An air cleaner 15 is disposed in the most upstream portion of the intake passage 12. The air cleaner 15 purifies air suctioned into the intake passage 12. In the intake passage 12, a compressor 17 of a turbocharger 16, an intercooler 18, and an intake throttle valve 19 are arranged in order from the air cleaner 15 toward the intake downstream side. The intake passage 12 branches at an intake manifold 21 that is disposed on the intake downstream side of the intake throttle valve 19. The intake passage 12 is connected to the combustion chambers 13 for respective cylinders of the internal combustion engine 11 through branch parts in the intake manifold 21.

In the internal combustion engine 11, fuel injection valves 22 are disposed for the respective cylinders. The fuel injection valves 22 inject fuels that are used for combustion in the respective combustion chambers 13. A common rail 23 that accumulates a high-pressure fuel is connected to the respective fuel injection valves 22. The high-pressure fuel that is discharged from a fuel pump 24 is supplied to the common rail 23.

Parts of the exhaust passage 14 that are connected to the respective combustion chambers 13 are exhaust ports 25. An exhaust manifold 26 and an exhaust turbine 27 of the turbocharger 16 are disposed in the exhaust passage 14. Exhaust gases discharged through the exhaust ports 25 from the respective combustion chambers 13 are collected in the exhaust manifold 26.

In the internal combustion engine 11, the air that is suctioned into the intake passage 12 is purified by the air cleaner 15 and then is introduced into the compressor 17 of the turbocharger 16. The compressor 17 has a compressor wheel 17A that rotates in the compressor 17. The air that is introduced into the compressor 17 is compressed by the rotation of the compressor wheel 17A and is discharged to the intercooler 18. The air, the temperature of which is increased by the compression, is cooled by the intercooler 18 and then is distributed and supplied to the combustion chambers 13 for the respective cylinders via the intake throttle valve 19 and the intake manifold 21. The flow rate of the air in the intake passage 12 is adjusted through opening control for the intake throttle valve 19.

In the combustion chambers 13 into which the air is introduced, the fuels are injected from the fuel injection valves 22 during the compression strokes of the respective cylinders. The air-fuel mixture of the air introduced through the intake passage 12 and the fuels injected from the fuel injection valves 22 is combusted in the combustion chambers 13. A piston (not illustrated) reciprocates by using a high-temperature and high-pressure combustion gas that is generated in this case. A crankshaft 20, which is an output shaft, rotates and a driving force (output torque) of the internal combustion engine 11 is obtained as a result of the reciprocation of the piston.

The exhaust gases that are generated by the combustion in the respective combustion chambers 13 are introduced into the exhaust turbine 27 of the turbocharger 16 through the exhaust manifold 26. A turbine wheel 27A in the exhaust turbine 27 is driven to rotate by the flow force of the introduced exhaust gases. The compressor wheel 17A of the compressor 17 is disposed in the intake passage 12. The compressor wheel 17A is driven to rotate in conjunction with the rotation of the turbine wheel 27A, and the compression of the air described above is performed.

The turbocharger 16 is provided with a variable nozzle mechanism 34 for adjusting the flow speed of the exhaust gas that is sprayed to the turbine wheel 27A. Hereinafter, a specific configuration of the turbocharger 16 will be described.

Figure 2:
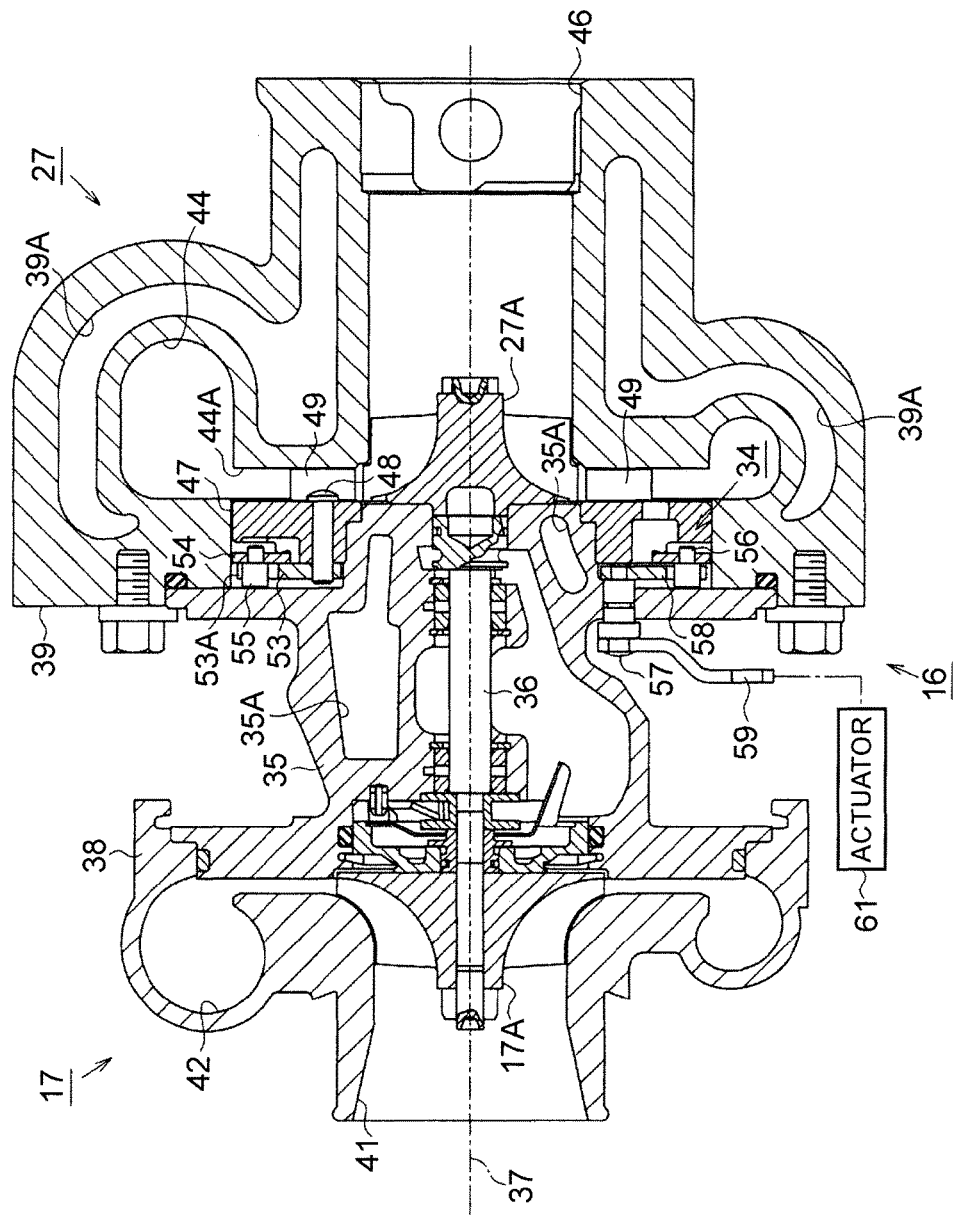
FIG. 2 is a cross-sectional view of a turbocharger according to the embodiment.

As illustrated in FIG. 2, a rotor shaft 36 is supported, to be rotatable about an axis 37 of the rotor shaft 36, in a center housing 35 of the turbocharger 16. The compressor wheel 17A is attached to an end portion of the rotor shaft 36. The turbine wheel 27A is attached to the end portion of the rotor shaft 36 that is on the side opposite to the end portion to which the compressor wheel 17A is attached. A compressor housing 38 of the compressor 17 is attached to one end portion of the center housing 35 in a direction along the axis 37 of the rotor shaft 36 (axial direction) and a turbine housing 39 of the exhaust turbine 27 is attached to the other end portion. In this manner, the compressor 17 and the exhaust turbine 27 are connected by the center housing 35 in the turbocharger 16.

An intake inlet 41 is open on the axis 37 in the compressor housing 38. A compressor vortex chamber 42 is disposed around the compressor wheel 17A in the compressor housing 38. The compressor vortex chamber 42 spirally extends and communicates with the intake passage 12 (refer to FIG. 1). Accordingly, in the compressor housing 38, air is forced to be sent out to the intake passage 12 through the intake inlet 41 and then the compressor vortex chamber 42 when the compressor wheel 17A rotates about the axis 37 based on the rotation of the rotor shaft 36.

In the turbine housing 39, a spirally-extending turbine vortex chamber 44 is disposed around the turbine wheel 27A. The turbine vortex chamber 44 communicates with the exhaust passage 14 (refer to FIG. 1) of the internal combustion engine 11, and the exhaust gas of the internal combustion engine 11 is fed into the turbine vortex chamber 44 through the exhaust passage 14. This exhaust gas is sprayed to the turbine wheel 27A from an inner circumferential portion 44A, which is an outlet of the turbine vortex chamber 44. This spraying causes the turbine wheel 27A to rotate about the axis 37. An exhaust gas outlet 46 is open on the axis 37 in the turbine housing 39. The exhaust gas sprayed to the turbine wheel 27A is sent out to the exhaust downstream side of the exhaust passage 14 through the exhaust gas outlet 46.

Figure 3B:
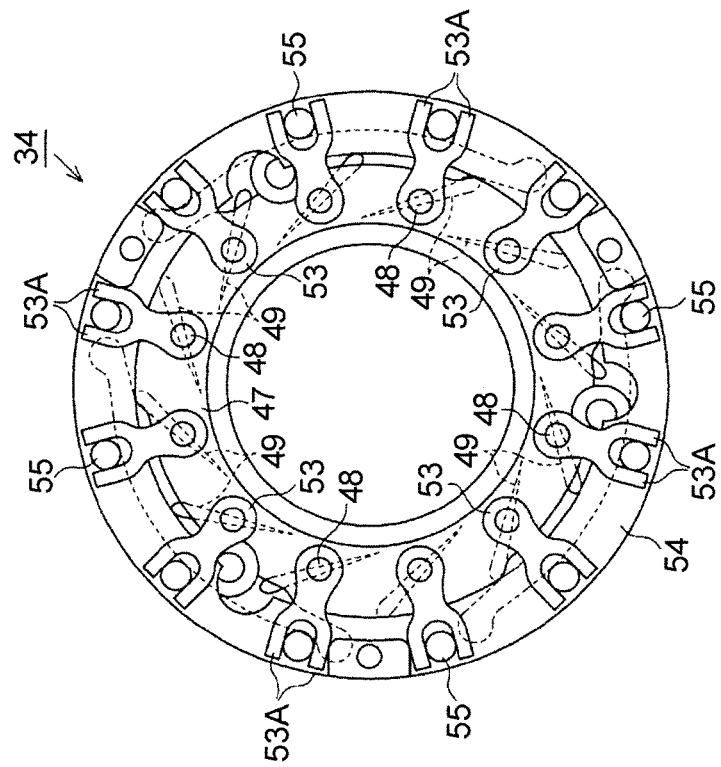
FIG. 3B is a side view of the variable nozzle mechanism according to the embodiment.
Figure 3A:
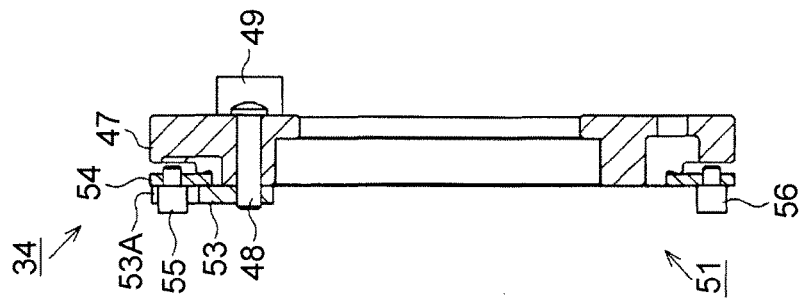
FIG. 3A is a cross-sectional view of a variable nozzle mechanism according to the embodiment.
Figure 4:
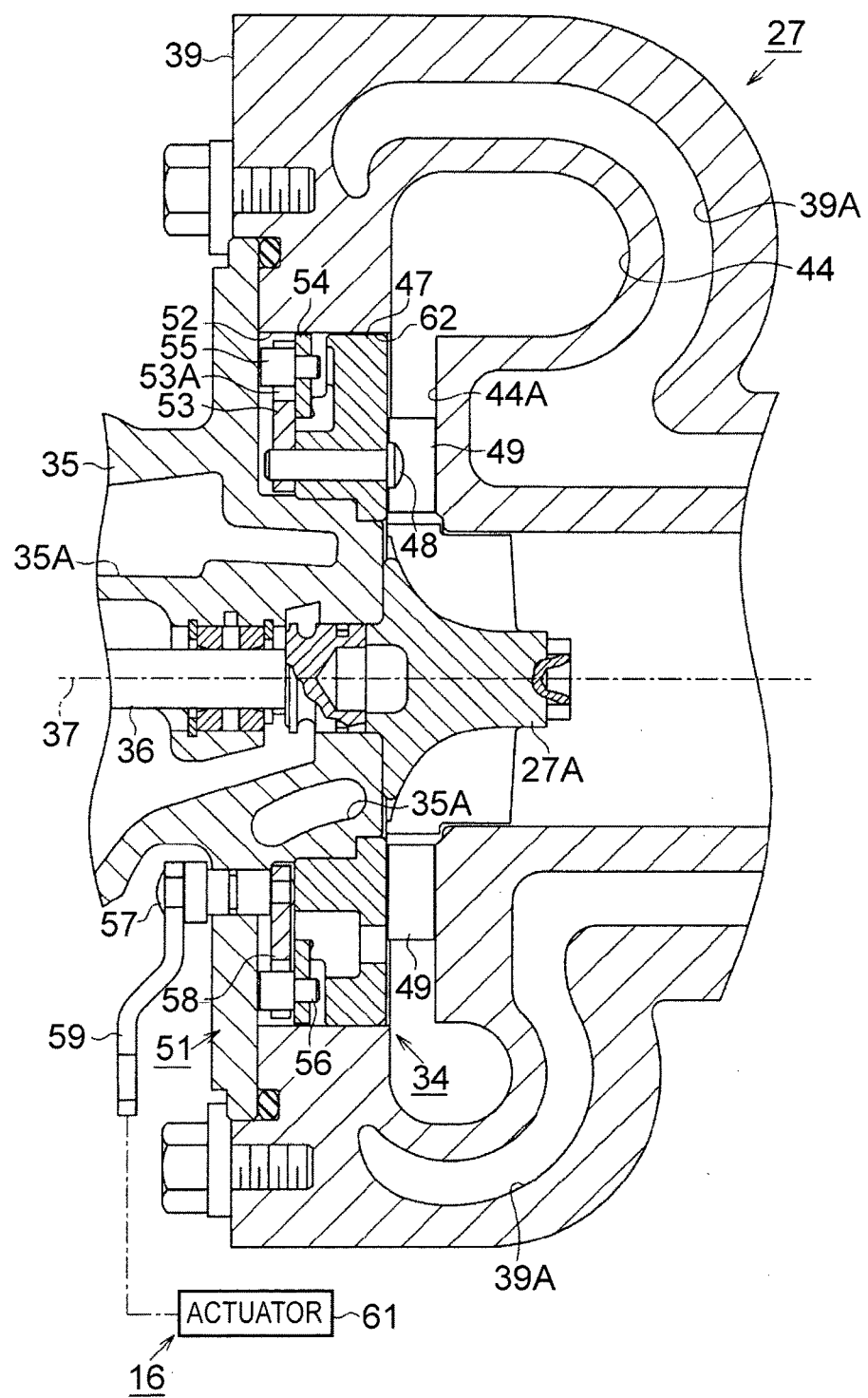
FIG. 4 is an enlarged cross-sectional view of the variable nozzle mechanism of the turbocharger according to the embodiment and a part in the vicinity thereof.

Next, the variable nozzle mechanism 34 will be described in detail. As illustrated in any one of FIGS. 3A, 3B, and 4, the variable nozzle mechanism 34 is provided with a nozzle ring 47, which is fixed in a state of facing the inner circumferential portion 44A of the turbine vortex chamber 44 between the center housing 35 and the turbine housing 39. In the nozzle ring 47, a plurality of shafts 48 are equiangularly disposed about the center of the circle of the nozzle ring 47. Each of the shafts 48 is pivotably supported while penetrating the nozzle ring 47 in the thickness direction of the nozzle ring 47. Nozzle vanes 49 are fixed as variable nozzles in end portions of the respective shafts 48 on the turbine vortex chamber 44 side.

The variable nozzle mechanism 34 is provided with a link mechanism 51 for synchronized pivoting of the plurality of nozzle vanes 49. A link chamber 52 is formed on the side (left side in FIG. 4) opposite to the inner circumferential portion 44A of the turbine vortex chamber 44 across the nozzle ring 47. The link mechanism 51 is incorporated into the link chamber 52.

The link mechanism 51 will be described in detail. A nozzle arm 53 is orthogonal to the shaft 48 and extends toward an outer edge portion of the nozzle ring 47. The nozzle arm 53 is fixed to the end portion (left end portion in FIG. 4) of each of the shafts 48 on the side opposite to the turbine vortex chamber 44. A bifurcating pair of pinching portions 53A is formed at a tip of the nozzle arm 53.

A unison ring 54 is pivotably disposed coaxially with the nozzle ring 47 between the nozzle arm 53 and the nozzle ring 47. In the unison ring 54, a plurality of pins 55 are equiangularly disposed about the center of the circle of the unison ring 54. The pin 55 is pinched by both of the pinching portions 53A of each of the nozzle arms 53. In this manner, the plurality of nozzle vanes 49 and the unison ring 54 are connected to each other by the shafts 48 of the respective nozzle vanes 49, the nozzle arms 53, and the like.

When the unison ring 54 pivots about the center of the circle of the unison ring 54, the pins 55 push the pinching portions 53A of the respective nozzle arms 53 in the pivoting direction of the unison ring 54. As a result, the nozzle arms 53 cause the shafts 48 to pivot. As a result of the pivoting of the shafts 48, the nozzle vanes 49 are subjected to opening and closing operations in a state of being synchronized about the respective shafts 48.

In the turbocharger 16, a drive mechanism for the pivoting of the unison ring 54 is disposed so as to operate the link mechanism 51. Specifically, a pin 56 is disposed in an outer edge portion of the unison ring 54 (lower end portion of the unison ring 54 in FIG. 4) and a support shaft 57 is pivotably inserted into the center housing 35. A connecting member 58 is fixed to an end portion of the support shaft 57 on the link chamber 52 side (right side in FIG. 4) and a lever 59 is fixed to the end portion on the opposite side. The connecting member 58 is pivotably connected to the pin 56. An actuator 61 such as an electric motor is connected to the lever 59.

When the actuator 61 is driven, the lever 59 is operated, and the support shaft 57 pivots, the connecting member 58 pivots about the support shaft 57 as a result of the pivoting of the support shaft 57. As a result, the unison ring 54 is pushed in a circumferential direction via the pin 56 by the connecting member 58 and pivots about the axis 37. As the unison ring 54 pivots, the gaps between the adjacent nozzle vanes 49 have a size corresponding to the pivot angle (nozzle opening) of each of the nozzle vanes 49. In this manner, the flow speed of the exhaust gas that is sprayed to the turbine wheel 27A is adjusted through the gap.

Since the flow speed of the exhaust gas is regulated as described above, the rotation speeds of the turbine wheel 27A, the rotor shaft 36, and the compressor wheel 17A are appropriately regulated and a supercharging pressure is adjusted. When the adjustment of the supercharging pressure is performed, the output of the internal combustion engine 11 can be improved and an overpressure in the combustion chambers 13 can be prevented at the same time.

As illustrated in FIG. 2, the turbocharger 16 is provided with a turbine coolant passage 39A and a housing coolant passage 35A. The turbine coolant passage 39A is formed in the turbine housing 39 as a coolant passage through which a coolant for the internal combustion engine 11 circulates. The housing coolant passage 35A is formed in the center housing 35. The turbocharger 16 has a structure in which the turbine housing 39 and the center housing 35 are cooled as the coolant for the internal combustion engine 11 is supplied to the turbine coolant passage 39A and the housing coolant passage 35A.

Figure 5:
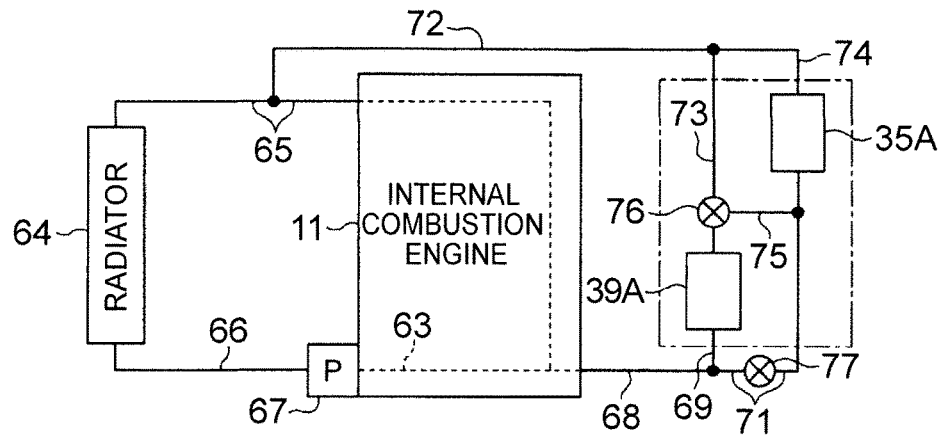
FIG. 5 is a schematic diagram illustrating an engine cooling system and a coolant circuit of a turbo cooling system according to the embodiment.

As illustrated in FIG. 5, an engine cooling system for cooling the internal combustion engine 11 is provided with a water jacket 63 that is formed in the internal combustion engine 11 and a radiator 64 that is a heat exchanger. The engine cooling system is provided with an engine coolant conduit 65 that guides the coolant flowing out of the water jacket 63 to the radiator 64 and an engine coolant conduit 66 that returns the coolant flowing out of the radiator 64 to the water jacket 63. In addition, a water pump 67 that pumps the coolant in the engine cooling system is disposed in the engine cooling system.

A turbo cooling system for cooling the turbocharger 16 is provided with a turbo supply coolant passage 68. The turbo supply coolant passage 68 is a coolant passage that guides the coolant to the turbocharger 16. The turbo supply coolant passage 68 is branched and extends from the water jacket 63. In addition, a first supply coolant passage 69 and a second supply coolant passage 71 are disposed in the turbo cooling system. The first supply coolant passage 69 guides the coolant in the turbo supply coolant passage 68 to the turbine coolant passage 39A. The second supply coolant passage 71 guides the coolant in the turbo supply coolant passage 68 to the housing coolant passage 35A. In this embodiment, the turbo supply coolant passage 68, the first supply coolant passage 69, and the second supply coolant passage 71 correspond to introduction paths that connect an inlet of the turbine coolant passage 39A and an inlet of the housing coolant passage 35A to each other in parallel.

The turbo cooling system is provided with a turbo discharge coolant passage 72. The turbo discharge coolant passage 72 is a coolant passage that guides the coolant discharged from the turbocharger 16 to the radiator 64 and merges with the engine coolant conduit 65. In addition, the turbo cooling system is provided with a first discharge coolant passage 73 and a second discharge coolant passage 74. The first discharge coolant passage 73 guides the coolant that is discharged from the turbine coolant passage 39A to the turbo discharge coolant passage 72. The second discharge coolant passage 74 guides the coolant that is discharged from the housing coolant passage 35A to the turbo discharge coolant passage 72. In this embodiment, the turbo discharge coolant passage 72, the first discharge coolant passage 73, and the second discharge coolant passage 74 correspond to discharge paths that connect an outlet of the turbine coolant passage 39A and an outlet of the housing coolant passage 35A to each other in parallel.

The turbo cooling system is provided with a communication passage 75 that allows the outlet of the turbine coolant passage 39A (specifically, the first discharge coolant passage 73) and the inlet of the housing coolant passage 35A (specifically, the second supply coolant passage 71) to communicate with each other. A first flow path switching valve 76 is disposed at a branch part of the communication passage 75 and the first discharge coolant passage 73. A second flow path switching valve 77 is disposed in the middle of the second supply coolant passage 71. In the turbo cooling system, the flow aspect of the coolant can be switched into any one of two flow aspects (first flow aspect and second flow aspect) through operation control for the first flow path switching valve 76 and the second flow path switching valve 77.

Figure 6:
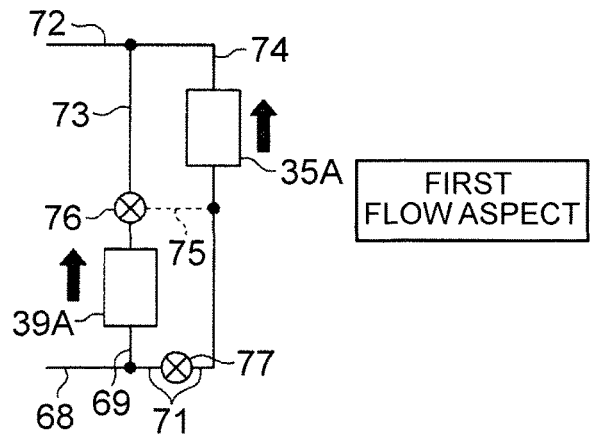
FIG. 6 is a schematic diagram illustrating a flow passage of a coolant in a first flow aspect in a turbo cooling system according to the embodiment.

As illustrated in FIG. 6, the housing coolant passage 35A and the turbine coolant passage 39A are connected in parallel in the first flow aspect. The arrows in FIG. 6 illustrate the flow of the coolant. In the state of the first flow aspect, the operation of the first flow path switching valve 76 is controlled, the turbine coolant passage 39A and the turbo discharge coolant passage 72 communicate with each other through the first discharge coolant passage 73, and communication between the turbine coolant passage 39A and the housing coolant passage 35A by the communication passage 75 is blocked. In addition, in the state of the first flow aspect, the operation of the second flow path switching valve 77 is controlled and the turbo supply coolant passage 68 and the housing coolant passage 35A communicate with each other through the second supply coolant passage 71.

Figure 7:
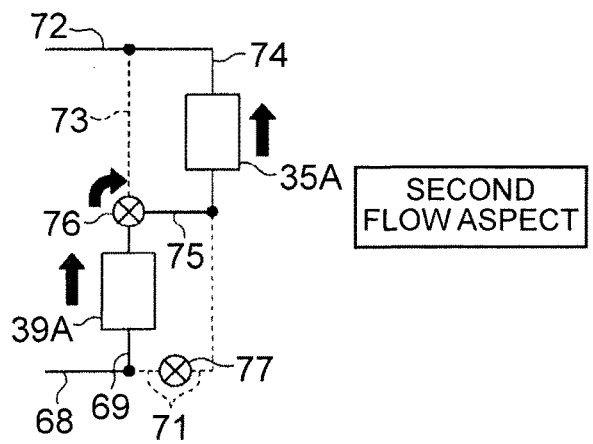
FIG. 7 is a schematic diagram illustrating the flow passage of the coolant in a second flow aspect in the turbo cooling system according to the embodiment.

As illustrated in FIG. 7, the housing coolant passage 35A and the turbine coolant passage 39A are connected in series in the second flow aspect. The arrows in FIG. 7 illustrate the flow of the coolant. In the state of the second flow aspect, the operation of the first flow path switching valve 76 is controlled, communication between the turbine coolant passage 39A and the turbo discharge coolant passage 72 through the first discharge coolant passage 73 is blocked, and the turbine coolant passage 39A and the housing coolant passage 35A communicate with each other through the communication passage 75. In addition, in the state of the second flow aspect, the operation of the second flow path switching valve 77 is controlled and communication between the turbo supply coolant passage 68 and the housing coolant passage 35A through the second supply coolant passage 71 is blocked.

As illustrated in FIG. 1, an exhaust gas control apparatus 81 for purifying exhaust gas is disposed in the exhaust passage 14 of the internal combustion engine 11. The exhaust gas control apparatus 81 is provided with a fuel addition valve 82 for adding a fuel to the exhaust gas. The exhaust gas control apparatus 81 is provided with an oxidation catalyst 83 that oxidizes hydrocarbon (HC) in the exhaust gas and a filter 84 that collects particulate matter (PM) in the exhaust gas.

The oxidation catalyst 83 is disposed on the exhaust downstream side of the exhaust turbine 27 in the exhaust passage 14. The oxidation catalyst 83 is a catalyst that purifies the exhaust gas through the oxidation of the HC and carbon monoxide (CO) in the exhaust gas. The filter 84 is disposed on a further exhaust downstream side than the oxidation catalyst 83 in the exhaust passage 14. A porous material that allows the passage of a gas component in the exhaust gas and prevents the passage of the PM in the exhaust gas constitutes the filter 84. In the filter 84, a catalyst for promoting the oxidation of the PM is supported. The fuel addition valve 82 is disposed on a further exhaust upstream side (specifically, the exhaust manifold 26) than the exhaust turbine 27 in the exhaust passage 14. The fuel addition valve 82 is connected to the fuel pump 24 through a fuel passage 82A. The fuel addition valve 82 injects (adds) a fuel provided from the fuel pump 24 into the exhaust gas.

Various sensors for detecting operating conditions of the internal combustion engine 11 are disposed in the engine system, the main component of which is the internal combustion engine 11. Examples of the various sensors include a crank sensor 91, a water temperature sensor 92, and a differential pressure sensor 93. The crank sensor 91 detects the rotation speed (engine rotation speed NE) of the crankshaft 20. The water temperature sensor 92 detects the temperature of the coolant (coolant temperature THW) for the internal combustion engine 11. The differential pressure sensor 93 detects the exhaust gas pressure difference (pressure difference $\Delta P$) between the exhaust upstream side and the exhaust downstream side of the filter 84 in the exhaust passage 14.

The engine system is provided with an electronic control unit 90, the main component of which is, for example, a microcomputer. Output signals from the various sensors are incorporated into the electronic control unit 90. The electronic control unit 90 performs various types of computation based on the output signals from the various sensors, and executes various types of control regarding the operation of the internal combustion engine 11 based on the results of the computation. Examples of the various types of control include operation control for the fuel injection valves 22, operation control for the intake throttle valve 19, operation control for the fuel pump 24, and operation control for the variable nozzle mechanism 34 (specifically, the actuator 61).

The electronic control unit 90 executes operation control for the fuel addition valve 82 (PM regeneration control) for functional recovery of the filter 84 as one of the various types of control. During the PM regeneration control, the electronic control unit 90 drives the fuel addition valve 82 to be intermittently opened. In this manner, the fuel is added to the exhaust gas of the internal combustion engine 11. As the PM regeneration control is executed, the added fuel is oxidized in the exhaust gas and the filter 84. Then, the temperature of the filter 84 increases. During the PM regeneration control, the intermittent valve-opening driving for the fuel addition valve 82 is repeatedly executed so that the filter 84 is in a predetermined temperature state (for example, at least 600° C.). In this manner, the PM accumulated in the filter 84 is oxidized, turned into carbon dioxide ($CO_2$) and water ($H_2O$), and is discharged. In this manner, the PM is oxidized and regenerated in the filter 84.

In this embodiment, the execution of the PM regeneration control is controlled in accordance with the execution flag that is described below. In a case where the execution flag is ON, the execution of PM regeneration processing is allowed. In a case where the execution flag is OFF, the execution of PM regeneration control is prohibited.

The execution flag is turned ON when the following [Condition A] and [Condition B] are satisfied at the same time during the non-execution of the PM regeneration control.

[Condition A] PM accumulation amount PMsm reaching at least a pre-defined accumulation amount determination value A

[Condition B] Coolant temperature THW reaching at least a water temperature determination value B The PM accumulation amount PMsm is an estimated value of the amount of the PM that is collected by the filter 84 and accumulated. The PM accumulation amount PMsm is sequentially calculated by using a known method based on the operating conditions of the internal combustion engine 11 such as the pressure difference $\Delta P$.

When the [Condition A] and the [Condition B] are satisfied at the same time, it is determined that the PM accumulation amount PMsm has reached an amount requiring the execution of the PM regeneration control and the temperature of the internal combustion engine 11 is high enough to sufficiently increase the temperature of the exhaust gas through the execution of the PM regeneration control. In this case, the execution flag for the PM regeneration control is turned ON and the execution of the PM regeneration processing is allowed. When the [Condition A] is not satisfied, the PM accumulation amount PMsm is below the amount requiring the regeneration processing. In this case, the execution flag is not turned ON and the execution of the PM regeneration control is not allowed. When the [Condition B] is not satisfied, the temperature of the internal combustion engine 11 is low and the temperature of the exhaust gas cannot be sufficiently increased even if the PM regeneration processing is performed. In this case, the execution flag is not turned ON and the execution of the PM regeneration processing is not allowed.

In this embodiment, the amount of the PM collected by the filter 84 and accumulated is considered to be sufficiently decreased when the following [Condition C] is satisfied during the execution of the PM regeneration control. In this case, the execution flag is turned OFF. As the execution flag is turned OFF, the execution of the PM regeneration control is stopped.

[Condition C] PM accumulation amount PMsm becoming equal to or less than a predetermined regeneration termination value PMe In the turbocharger 16, a gap 62 (FIG. 4) is present in a partition wall between the inner circumferential portion 44A of the turbine vortex chamber 44 as an exhaust flow path and the link chamber 52 (specifically, between the turbine housing 39 and the nozzle ring 47). Accordingly, if the pressure of the exhaust gas in the turbine vortex chamber 44 is high, part of the exhaust gas may permeate into the link chamber 52 through the gap 62 while moving from the turbine vortex chamber 44 toward the turbine wheel 27A. The fuel that is added from the fuel addition valve 82 is insufficiently vaporized if the temperature of the exhaust gas is low or causes aggregation on the surface of the turbine housing 39 if the temperature of the turbine housing 39 is low. If the insufficiently-vaporized fuel and the aggregated fuel (hereinafter, these fuels will be referred to as a liquid fuel) move along with the exhaust gas into the link chamber 52 through the gap 62 from the turbine vortex chamber 44, the liquid fuel may adhere to the wall surface of the link chamber 52 and each portion of the link mechanism 51. In a case where the temperature in the link chamber 52 is low, the fuel that adheres to the link mechanism 51 may remain in a liquid state as it is instead of being vaporized immediately. If the state where the liquid fuel adheres to the link mechanism 51 continues, soot in the exhaust gas may adhere to the adhering fuel or the fuel may be gradually altered to give rise to a deposit.

In this embodiment, the link chamber 52 is heated when the PM regeneration control is executed. Hereinafter, processing regarding the control for heating the link chamber 52 (heating control processing) will be described.

Figure 8:
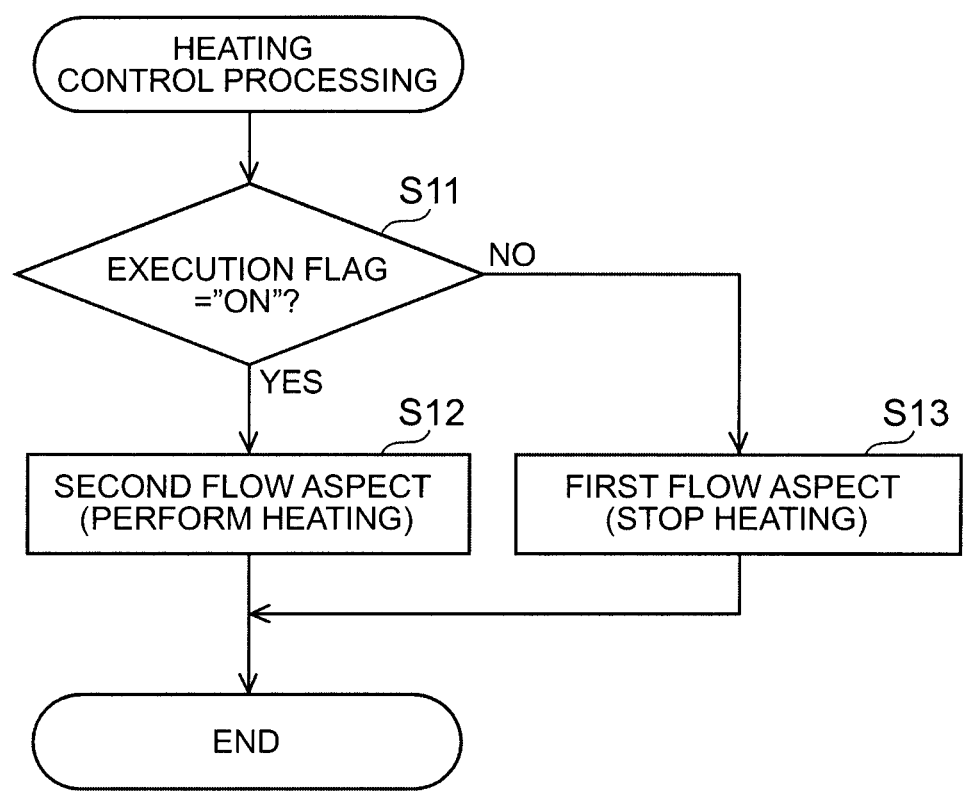
FIG. 8 is a flowchart illustrating an execution procedure of heating control processing according to the embodiment.

FIG. 8 illustrates an execution procedure of the heating control processing. A series of processing that is illustrated in the flowchart in this drawing is executed by the electronic control unit 90 as interruption processing for each predetermined cycle. In this processing, as illustrated in FIG. 8, it is determined first whether or not the execution flag for the PM regeneration control is ON state (Step S11).

In a case where the execution flag is ON state (Step S11: YES), the operations of the first flow path switching valve 76 and the second flow path switching valve 77 are controlled and the flow aspect of the coolant becomes the second flow aspect (Step S12). Since the turbine coolant passage 39A (refer to FIG. 7) and the housing coolant passage 35A are connected in series in the second flow aspect, the coolant that is increased in temperature through the turbine coolant passage 39A in the exhaust turbine 27 flows into the housing coolant passage 35A in the center housing 35. The center housing 35 and the link chamber 52, which is arranged at a position adjacent to the center housing 35, are heated by the high-temperature coolant introduced into the housing coolant passage 35A in this manner.

In a case where the execution flag is OFF state (Step S11: NO), the operations of the first flow path switching valve 76 and the second flow path switching valve 77 are controlled and the flow aspect of the coolant becomes the first flow aspect (Step S13). Since the turbine coolant passage 39A (refer to FIG. 6) and the housing coolant passage 35A are connected in parallel in the first flow aspect, the coolant that has a relatively low temperature in the turbo supply coolant passage 68 flows into each of the turbine coolant passage 39A and the housing coolant passage 35A. In this case, the flow of the high-temperature coolant, which passed through the turbine coolant passage 39A, into the housing coolant passage 35A is stopped, and thus the heating of the center housing 35 and the link chamber 52 by the coolant is also stopped.

Hereinafter, an effect of the execution of the heating control processing will be described. In the turbocharger 16, the liquid fuel adheres into the link chamber 52, and the adhering fuel may be gradually altered to give rise to the deposit if the state where the fuel adheres continues. Accordingly, the liquefaction of the fuel permeating into the link chamber 52 can be suppressed by sufficiently increasing the temperature in the link chamber 52. In this manner, the adhesion of the fuel into the link chamber 52 is suppressed, and thus the accumulation of the deposit can also be suppressed. As a result of various experiments by the inventor, it has been found that the adhesion of the liquid fuel in the link chamber 52 rarely occurs and the accumulation of the deposit is appropriately suppressed, even in a case where the fuel has permeated into the link chamber 52, once the fuel in the link chamber 52 is vaporized by sufficiently increasing the temperature in the link chamber 52. Still, maintaining a high-temperature state of the turbocharger 16 by heating the turbocharger 16 without stopping the heating may result in overheating deteriorating the reliability of the turbocharger 16.

In this embodiment, the link chamber 52 can be heated therein for a high temperature, by the high-temperature coolant that passed through the turbine coolant passage 39A, during the execution of the PM regeneration control. Accordingly, even in a case where the fuel has permeated into the link chamber 52, the fuel can be vaporized and the link chamber 52 can have a dry state therein. Since the exhaust gas of the internal combustion engine 11 flows at a high speed in the turbine vortex chamber 44, the exhaust gas in the link chamber 52 is discharged out of the link chamber 52 through the gap 62 (FIG. 4) in the partition wall between the inner circumferential portion 44A of the turbine vortex chamber 44 and the link chamber 52. Accordingly, the fuel vaporized in the link chamber 52 is also discharged out of the link chamber 52 into the turbine vortex chamber 44 along with the flow of the exhaust gas. In this manner, the fuel that has permeated into the link chamber 52 is discharged to the turbine vortex chamber 44 and treated and a state where the liquid fuel adheres into the link chamber 52 is suppressed, and thus the alteration of the fuel to the deposit can be suppressed. Accordingly, malfunctioning of the variable nozzle mechanism 34 attributable to the accumulation of the deposit can be suppressed.

In addition, the heating of the link chamber 52 can be stopped when the possibility of the permeation of the fuel into the link chamber 52 is low with the PM regeneration control not executed. In this case, the temperature of the turbocharger 16 can be lowered. Compared to heating the turbocharger 16 without stopping the heating, an increase in the temperature of the turbocharger 16 can be suppressed. In this manner, deterioration in the reliability of the turbocharger 16 attributable to overheating can be suppressed.

In this embodiment, the center housing 35 and the link chamber 52 are heated by using the housing coolant passage 35A, which is disposed so as to cool the center housing 35. Accordingly, a structure for heating the center housing 35 and the link chamber 52 can be realized without adding complexity to the structure of the turbocharger 16.

In this embodiment, the housing coolant passage 35A and the turbine coolant passage 39A are connected in series (refer to FIG. 7) when the flow aspect of the coolant becomes the second flow aspect through the operation control for the first flow path switching valve 76 and the second flow path switching valve 77 during the execution of the heating of the link chamber 52. Then, it is possible to allow only the coolant that is increased in temperature through the turbine coolant passage 39A to flow into the housing coolant passage 35A, and thus the link chamber 52 can be efficiently heated by using the coolant. When the heating of the link chamber 52 is stopped, the flow aspect of the coolant becomes the first flow aspect through the operation control for the first flow path switching valve 76 and the second flow path switching valve 77, and the housing coolant passage 35A and the turbine coolant passage 39A are connected in parallel (refer to FIG. 6). Accordingly, it is possible to allow only the coolant that has a relatively low temperature without passing through the turbine coolant passage 39A to flow into the housing coolant passage 35A instead of allowing the coolant that is increased in temperature through the turbine coolant passage 39A to flow into the housing coolant passage 35A. Then, the center housing 35 can be appropriately cooled by using the coolant.

According to the embodiment described above, the following effects can be achieved. Even in a case where the fuel has permeated into the link chamber 52 with the PM regeneration control executed, the alteration of the fuel into the deposit can be suppressed. The turbocharger 16 is temporarily heated so that the accumulation of the deposit in the link chamber 52 is suppressed. Compared to heating the turbocharger 16 without stopping the heating, an increase in the temperature of the turbocharger 16 can be suppressed, and deterioration in the reliability of the turbocharger 16 attributable to overheating can be suppressed.

According to this embodiment, the center housing 35 and the link chamber 52 can be heated by using the housing coolant passage 35A, which is disposed so as to cool the center housing 35. Accordingly, a structure for heating the center housing 35 and the link chamber 52 can be realized without adding complexity to the structure of the turbocharger 16.

This embodiment is provided with the communication passage 75 that allows the outlet of the turbine coolant passage 39A and the inlet of the housing coolant passage 35A to communicate with each other and the first flow path switching valve 76 that is disposed in the communication passage 75. In addition, according to this embodiment, the heating of the link chamber 52 is executed by allowing the flow of water from the outlet of the turbine coolant passage 39A into the inlet of the housing coolant passage 35A via the communication passage 75 through the operation control for the first flow path switching valve 76. Accordingly, it is possible to allow the coolant that is increased in temperature through the turbine coolant passage 39A to be introduced into the housing coolant passage 35A in the center housing 35 via the communication passage 75. In this manner, the link chamber 52, which is arranged at a position adjacent to the center housing 35, can be heated.

According to this embodiment, the heating of the link chamber 52 is stopped by prohibiting the flow of the coolant from the outlet of the turbine coolant passage 39A into the inlet of the housing coolant passage 35A via the communication passage 75 through the operation control for the first flow path switching valve 76. Accordingly, it is possible to prohibit the flow of the coolant that is increased in temperature through the turbine coolant passage 39A into the housing coolant passage 35A while allowing only the coolant that has a relatively low temperature in the second supply coolant passage 71 to flow into the housing coolant passage 35A. Accordingly, a state where the heating of the link chamber 52 is stopped can be achieved.

According to this embodiment, the housing coolant passage 35A and the turbine coolant passage 39A are connected in series during the execution of the heating of the link chamber 52. Accordingly, the link chamber 52 can be efficiently heated by using the coolant that is increased in temperature through the turbine coolant passage 39A. In addition, when the heating of the link chamber 52 is stopped, the housing coolant passage 35A and the turbine coolant passage 39A are connected in parallel, and thus the center housing 35 can be appropriately cooled by using the coolant that has a relatively low temperature without passing through the turbine coolant passage 39A.

The embodiment described above may be modified as follows. A period when the flow aspect of the coolant is switched into the second flow aspect (refer to FIG. 7) so as to heat the link chamber 52 may overlap with at least part of a period when the PM regeneration control is executed. The timing of the initiation of the execution of the PM regeneration control and the timing of the switching into the second flow aspect may be the same as the timing of the ON operation of the execution flag. The timing of the initiation of the execution of the PM regeneration control and the timing of the switching into the second flow aspect may be a short period of time after the ON operation of the execution flag. The timing of the stopping of the execution of the PM regeneration control and the timing of the switching into the first flow aspect may be the same as the timing of the OFF operation of the execution flag. The timing of the stopping of the execution of the PM regeneration control and the timing of the switching into the first flow aspect may be a short period of time after the OFF operation of the execution flag. Hereinafter, examples of the setting of the respective periods (Examples 1 to 5) will be described.

Example 1

Figure 9:
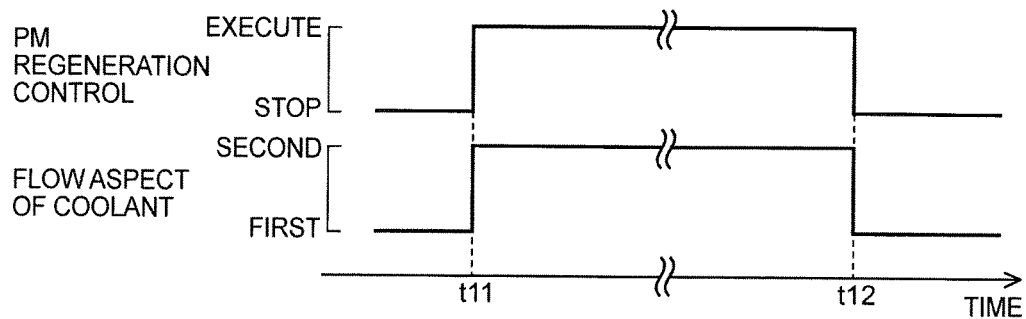
FIG. 9 is a timing chart illustrating a first example of an execution aspect of the heating control processing.

As illustrated in FIG. 9, the execution of the PM regeneration control is initiated and the switching into the second flow aspect is executed at the same time at time t11. Then, at time t12, the execution of the PM regeneration control is stopped and the switching into the first flow aspect is executed at the same time.

Example 2

Figure 10:
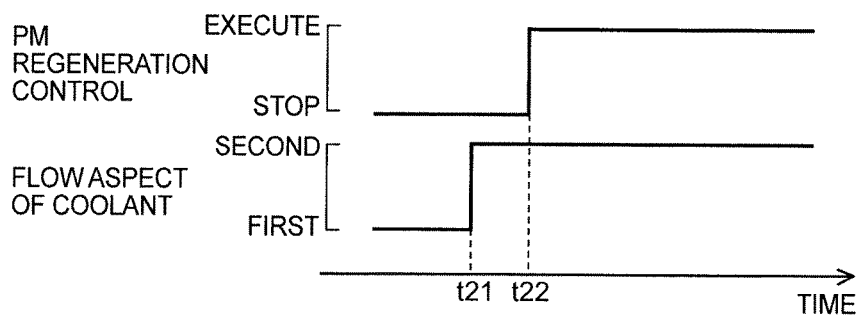
FIG. 10 is a timing chart illustrating a second example of the execution aspect of the heating control processing.

The switching into the second flow aspect is executed prior to the initiation of the execution of the PM regeneration control. For example, as illustrated in FIG. 10, the switching into the second flow aspect is executed at time t21, and the execution of the PM regeneration control is initiated at time t22, which is a short period of time after time t21.

If the timing of the initiation of the heating of the link chamber 52 precedes the timing of the initiation of the fuel addition by the PM regeneration control as in this example, the temperature in the link chamber 52 can be increased in advance when the fuel addition to the exhaust gas by the PM regeneration control is initiated. Accordingly, it is possible to suppress the liquefaction of the fuel permeating into the link chamber 52, and the adhesion of the deposit to the link mechanism 51 can be suppressed.

Example 3

Figure 11:
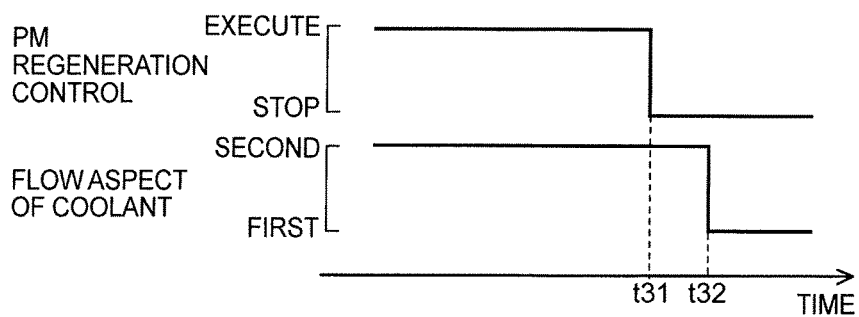
FIG. 11 is a timing chart illustrating a third example of the execution aspect of the heating control processing.

The switching into the first flow aspect is executed a short period of time after the stopping of the execution of the PM regeneration control. For example, as illustrated in FIG. 11, the execution of the PM regeneration control is stopped at time t31, and the switching into the first flow aspect is executed at time t32, which is a short period of time after time t31.

If the timing of the stopping of the fuel addition by the PM regeneration control precedes the timing of the stopping of the heating of the link chamber 52 as in this example, the temperature in the link chamber 52 can be maintained at a high temperature until the termination of the fuel addition by the PM regeneration control. Accordingly, it is possible to suppress the liquefaction of the fuel permeating into the link chamber 52, and the adhesion of the deposit to the link mechanism 51 can be suppressed.

Example 4

Figure 12:
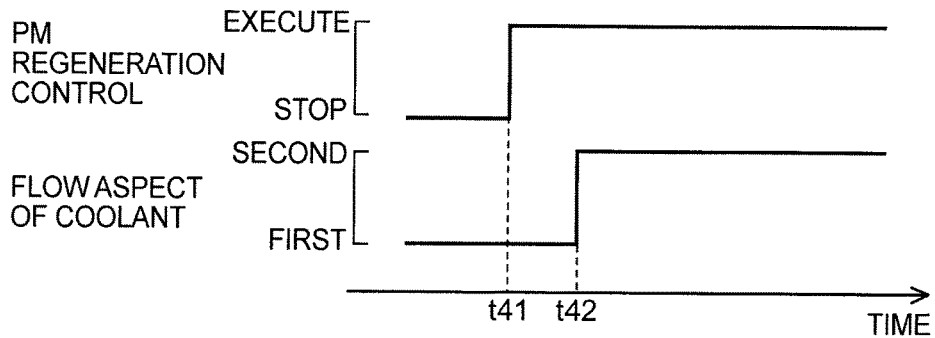
FIG. 12 is a timing chart illustrating a fourth example of the execution aspect of the heating control processing.
Figure 13:
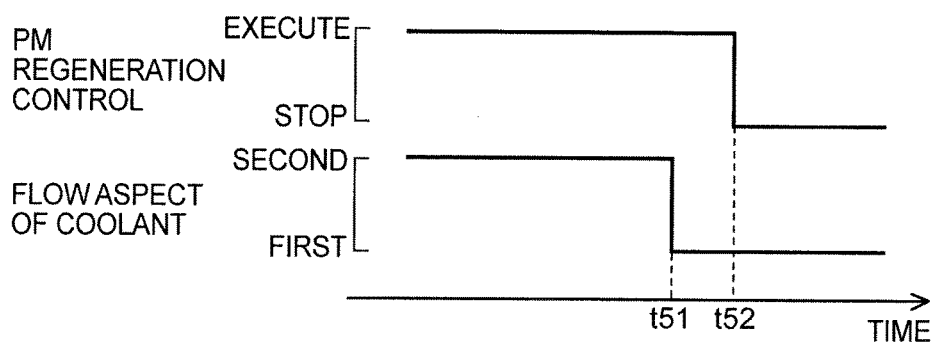
FIG. 13 is a timing chart illustrating a fifth example of the execution aspect of the heating control processing.

As illustrated in FIG. 12, the execution of the PM regeneration control is initiated at time t41, and the switching into the second flow aspect is executed at time t42, which is a short period of time after time t41. (Example 5) As illustrated in FIG. 13, the switching into the first flow aspect is executed at time t51, and the execution of the PM regeneration control is stopped at time t52, which is a short period of time after time t51.

The arrangement of the flow path switching valves in the turbo cooling system can be changed to any arrangement if the flow aspect of the coolant can be switched into any one of the two flow aspects (first flow aspect and second flow aspect).

Figure 14:
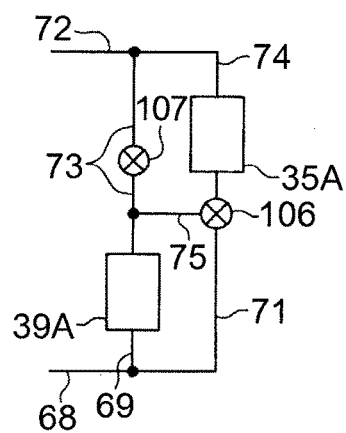
FIG. 14 is a schematic diagram illustrating a coolant circuit of a turbo cooling system according to a modification example.

For example, as illustrated in FIG. 14, a third flow path switching valve 106 can be disposed at a branch part of the second supply coolant passage 71 and the communication passage 75 and the third flow path switching valve 106 can be disposed in the middle of the first discharge coolant passage 73. In the state of the first flow aspect of this example, the third flow path switching valve 106 may allow the turbo supply coolant passage 68 and the housing coolant passage 35A to communicate with each other through the second supply coolant passage 71 and communication between the turbine coolant passage 39A and the housing coolant passage 35A by the communication passage 75 may be blocked. In addition, in the state of the first flow aspect, a fourth flow path switching valve 107 may allow the turbine coolant passage 39A and the turbo discharge coolant passage 72 to communicate with each other through the first discharge coolant passage 73. In the state of the second flow aspect, the third flow path switching valve 106 may block communication between the housing coolant passage 35A and the turbo supply coolant passage 68 through the second supply coolant passage 71 and allow the turbine coolant passage 39A and the housing coolant passage 35A to communicate with each other through the communication passage 75. In addition, in the state of the second flow aspect, the fourth flow path switching valve 107 may block communication between the turbine coolant passage 39A and the turbo discharge coolant passage 72 through the first discharge coolant passage 73.

During the execution of the PM regeneration control, the housing coolant passage 35A and the turbine coolant passage 39A may not be connected in series if the coolant that is heated in the turbine coolant passage 39A can be introduced into the housing coolant passage 35A. For example, a communication passage that connects the middle of the housing coolant passage 35A to the inlet of the turbine coolant passage 39A can be disposed and a communication passage that connects the outlet of the housing coolant passage 35A to the middle of the turbine coolant passage 39A can be disposed instead of the communication passage 75. In addition, the second flow path switching valve 77 can be omitted.

The link chamber 52 may be heated by introducing the coolant at a high-temperature part of the engine cooling system (for example, part extending around the combustion chambers 13) into the housing coolant passage 35A instead of heating the link chamber 52 by introducing the coolant that is heated in the turbine coolant passage 39A into the housing coolant passage 35A. Also, the link chamber 52 can be heated by, for example, energizing an electric heater attached to the center housing 35.

When the temperature of the exhaust gas of the internal combustion engine 11 is high, both the temperature of the turbocharger 16 and the temperature in the link chamber 52 are likely to be increased. The fuel that has permeated into the link chamber 52 is vaporized and the link chamber 52 can have a dry state therein, even if the link chamber 52 is not heated by using a high-temperature coolant, a heater, or the like, if the temperature in the link chamber 52 is sufficiently increased by heat received from the exhaust gas of the internal combustion engine 11. Accordingly, the alteration of the fuel to the deposit is suppressed.

In the engine system, the heating of the link chamber 52 by a high-temperature coolant, a heater, or the like may be prohibited, even when the PM regeneration control is executed, if the temperature of the link chamber 52 is high enough to appropriately suppress the accumulation of the deposit. According to this apparatus, unnecessary execution of heating by a high-temperature coolant, a heater, or the like can be suppressed when the accumulation of the deposit in the link chamber 52 is suppressed so that the temperature in the link chamber 52 is sufficiently increased. Accordingly, deterioration in the reliability of the turbocharger 16 attributable to overheating can be suppressed. Whether the temperature of the link chamber 52 is high enough to appropriately suppress the accumulation of the deposit can be determined based on, for example, "the temperature of the exhaust gas of the internal combustion engine 11 being at least a predetermined temperature", "the operating condition of the internal combustion engine 11 being in a predetermined high-load operation area", or "the temperature in the link chamber 52 that is estimated from the operating condition of the internal combustion engine 11 being at least a predetermined temperature".

In the embodiment described above, the fuel addition to the exhaust gas is executed so as to oxidize the PM collected by the filter 84. However, the invention is not limited thereto. The engine system may execute the fuel addition to the exhaust gas for functional recovery of an exhaust gas control apparatus (for example, an exhaust gas purifying catalyst). Examples of the engine system include a system in which fuel addition to exhaust gas is executed so as to emit sulfur dioxide (SOx) from a nitrogen oxide (NOx) storage-reduction catalyst in a case where the NOx storage-reduction catalyst is poisoned by SOx and the storage capacity of NOx is reduced.

The embodiment described above is not limited to the engine system in which the fuel addition is performed through the fuel injection from the fuel addition valve 82. The embodiment described above can also be applied to an engine system in which fuel addition to exhaust gas is performed through fuel injection from the fuel injection valves 22 performed during an expansion stroke and an exhaust stroke after fuel injection for combustion in the combustion chambers 13 (so-called after-injection or post-injection).

What is claimed is:
1. An engine system comprising:
a turbocharger including a variable nozzle mechanism, the variable nozzle mechanism including a plurality of nozzle vanes, a link chamber and a link mechanism, the plurality of nozzle vanes being disposed in an exhaust flow path of an exhaust turbine, the link chamber, being adjacent to the exhaust flow path, and the link mechanism being disposed in the link chamber and being configured to connect the plurality of nozzle vanes;
an exhaust gas control apparatus disposed on an exhaust downstream side of the exhaust turbine in an exhaust passage of an internal combustion engine, and the exhaust gas control apparatus being configured to purify exhaust gas;
a fuel addition device disposed on an exhaust upstream side of the exhaust turbine, and the fuel addition device being configured to add fuel to the exhaust gas of the internal combustion engine to recover a function of the exhaust gas control apparatus;
a heating unit configured to heat the link chamber; and
an electronic control unit configured to execute a heating control, in the heating control, the electronic control unit being configured to initiate and stop heating of the link chamber by the heating unit, and the electronic control unit being configured to execute the heating control in a period overlapping with at least part of a period when an addition of fuel by the fuel addition device is executed, wherein
the turbocharger includes a compressor, the exhaust turbine and a center housing, the compressor being disposed in an intake passage of the internal combustion engine, and the center housing being configured to connect the compressor and the exhaust turbine to each other, wherein the link chamber is disposed between the exhaust turbine and the center housing, wherein the center housing has a housing coolant passage through which a coolant circulates, wherein the heating unit is configured to heat the link chamber by introducing a high-temperature coolant into the housing coolant passage.

2. The engine system according to claim 1,
wherein the electronic control unit is configured to set a timing of initiation of the heating of the link chamber to precede a timing of initiation of the addition of fuel by the fuel addition device.

3. The engine system according to claim 1,
wherein the electronic control unit is configured to set a timing of stopping of the addition of fuel by the fuel addition device to precede a timing of stopping of the heating of the link chamber.

4. The engine system according to claim 1, further comprising:
a communication passage being configured to connect an outlet of a turbine coolant passage and an inlet of the housing coolant passage, the exhaust turbine including the turbine coolant passage through which the coolant circulates; and
a flow path switching valve disposed in the communication passage,
wherein the electronic control unit is configured to execute operation control of the flow path switching valve to allow the flow of the coolant from the outlet of the turbine coolant passage into the inlet of the housing coolant passage via the communication passage during the execution of the heating of the link chamber by the heating unit, and
wherein the electronic control unit is configured to prohibit the flow of the coolant from the outlet of the turbine coolant passage into the inlet of the housing coolant passage via the communication passage during the stopping of the heating of the link chamber by the heating unit.

5. The engine system according to claim 4, further comprising:
an introduction path configured to connect an inlet of the turbine coolant passage and the inlet of the housing coolant passage to each other in parallel, and
a discharge path configured to connect the outlet of the turbine coolant passage and an outlet of the housing coolant passage to each other in parallel,
wherein the electronic control unit is configured to connect the housing coolant passage and the turbine coolant passage to each other in series during the execution of the heating of the link chamber by the heating unit, and
wherein the electronic control unit is configured to connect the housing coolant passage and the turbine coolant passage to each other in parallel during the stopping of the heating of the link chamber by the heating unit.

6. The engine system according to claim 1,
wherein the electronic control unit is configured to prohibit the heating of the link chamber when a temperature of the exhaust gas of the internal combustion engine is at least a predetermined temperature during the execution of the fuel addition by the fuel addition device.

7. A control apparatus for an engine system, the engine system including a turbocharger, an exhaust gas control apparatus, a fuel addition device, and a heating unit, and the turbocharger including a variable nozzle mechanism,
the variable nozzle mechanism including:
a plurality of nozzle vanes disposed in an exhaust flow path of an exhaust turbine;
a link chamber adjacent to the exhaust flow path; and
a link mechanism disposed in the link chamber and configured to connect the plurality of nozzle vanes;
the exhaust gas control apparatus being disposed on an exhaust downstream side of the exhaust turbine in an exhaust passage of an internal combustion engine, and the exhaust gas control apparatus being configured to purify exhaust gas;
the fuel addition device being disposed on an exhaust upstream side of the exhaust turbine, and the fuel addition device being configured to add fuel to the exhaust gas of the internal combustion engine to recover a function of the exhaust gas control apparatus; and
the heating unit being configured to heat the link chamber;
the control apparatus comprising:
an electronic control unit configured to execute a heating control, in the heating control, the electronic control unit being configured to initiate and stop heating of the link chamber by the heating unit, and the electronic control unit being configured to execute the heating control in a period overlapping with at least part of a period when an addition of fuel by the fuel addition device is executed, wherein
the turbocharger includes a compressor, the exhaust turbine and a center housing, the compressor being disposed in an intake passage of the internal combustion engine, and the center housing being configured to connect the compressor and the exhaust turbine to each other,
wherein the link chamber is disposed between the exhaust turbine and the center housing;
wherein the center housing has a housing coolant passage through which a coolant circulates,
wherein the heating unit is configured to heat the link chamber by introducing a high-temperature coolant into the housing coolant passage.

8. A control method for an engine system, the engine system including a turbocharger, an exhaust gas control apparatus, a fuel addition device and a heating unit, and the turbocharger including a variable nozzle mechanism,
the variable nozzle mechanism including:
a plurality of nozzle vanes disposed in an exhaust flow path of an exhaust turbine;
a link chamber adjacent to the exhaust flow path; and
a link mechanism disposed in the link chamber and configured to connect the plurality of nozzle vanes;
the exhaust gas control apparatus being disposed on an exhaust downstream side of the exhaust turbine in an exhaust passage of an internal combustion engine, and the exhaust gas control apparatus being configured to purify exhaust gas; and
the fuel addition device being disposed on an exhaust upstream side of the exhaust turbine, and the fuel addition device being configured to add fuel to the exhaust gas of the internal combustion engine to recover a function of the exhaust gas control apparatus,
the turbocharger including a compressor, the exhaust turbine and a center housing, the compressor being disposed in an intake passage of the internal combustion engine, the center housing being configured to connect the compressor and the exhaust turbine to each other, the link chamber being disposed between the exhaust turbine and the center housing, the center housing having a housing coolant passage through which a coolant circulates, and the heating unit being configured to heat the link chamber by introducing a high-temperature coolant into the housing coolant passage, the control method comprising:

executing heating control for controlling initiation and stopping of heating of the link chamber by the heating unit, executing the heating control in a period overlapping with at least part of a period when an addition of fuel by the fuel addition device is executed, and introducing the high-temperature coolant into the housing coolant passage so as to heat the link chamber.

\* \* \* \* \*